United States Patent [19]

Poe

[11] 4,114,509

[45] Sep. 19, 1978

[54] FASTENER PLUNGER ENTRY RESISTANCE MEANS

[75] Inventor: L. Richard Poe, Long Beach, Calif.

[73] Assignee: Hartwell Corporation, Placentia, Calif.

[21] Appl. No.: 808,817

[22] Filed: Jun. 22, 1977

[51] Int. Cl.² ............................................. F16B 13/06
[52] U.S. Cl. ........................................... 85/84; 24/214
[58] Field of Search ............... 85/84, , 83, 80, 5 R, 85/82, 72; 24/214, 213 R, 208 A

[56] References Cited

U.S. PATENT DOCUMENTS

| | | | |
|---|---|---|---|
| 3,029,486 | 4/1962 | Raymond | 24/213 R X |
| 3,093,027 | 6/1963 | Rapata | 24/214 X |
| 3,112,547 | 12/1963 | Poe | 85/5 R |
| 3,116,528 | 1/1964 | Poe | 85/84 |
| 3,203,105 | 8/1965 | Whistler et al. | 85/5 R X |

*Primary Examiner*—Ramon S. Britts
*Attorney, Agent, or Firm*—Lyon & Lyon

[57] ABSTRACT

An entry resistance means for a two piece fastener of the type having a plunger and a grommet, the grommet including a set of fingers having a contracted position for insertion through an opening and an expanded position locking the grommet in the opening accomplished by axial insertion of the end of the plunger component between the fingers; the entry resistance means is disposed axially from the fingers and comprises mutually engagable portions of the grommet and plunger which increases the resistance to entry of the plunger into the grommet without change in the dimensions of the grommet.

2 Claims, 5 Drawing Figures

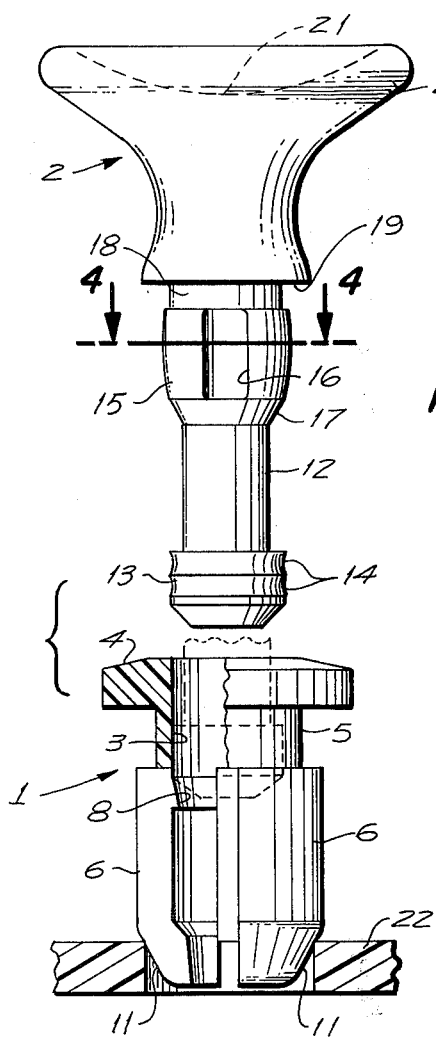
Fig. 1
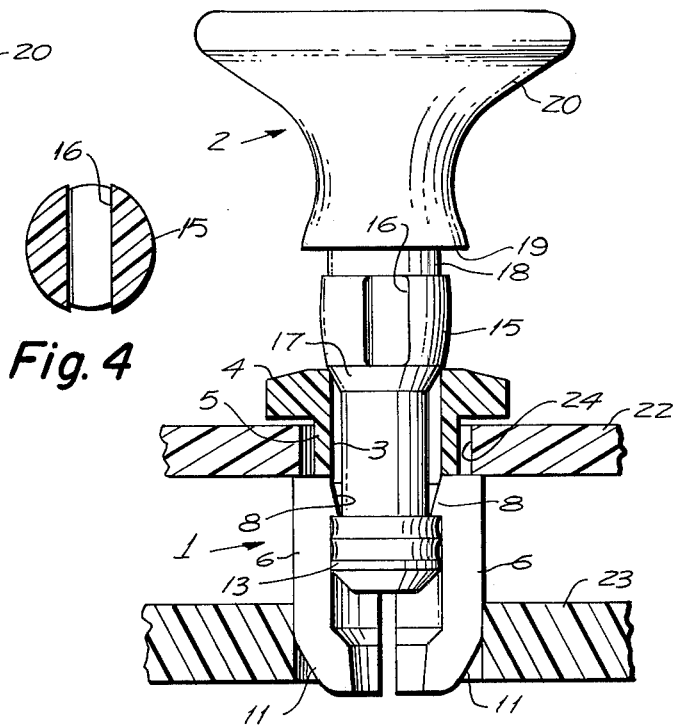
Fig. 4
Fig. 2
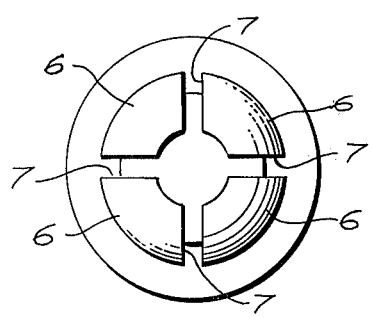
Fig. 5
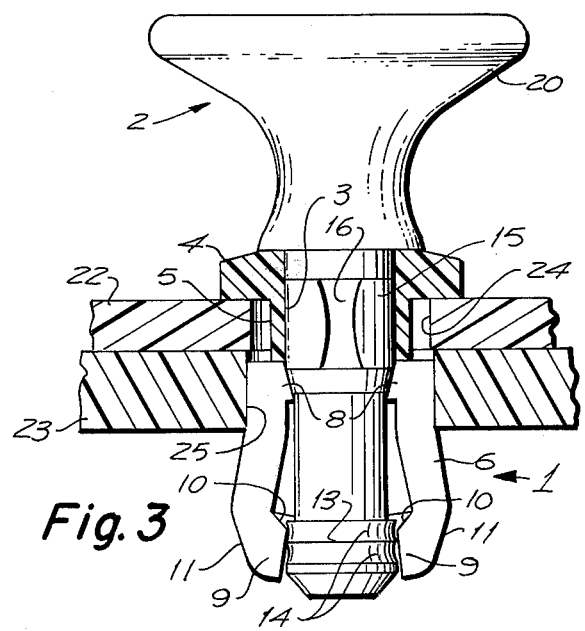
Fig. 3

FASTENER PLUNGER ENTRY RESISTANCE MEANS

BACKGROUND AND SUMMARY

The present invention is related to the disclosure shown in U.S. Pat. Nos. 3,112,547 and 3,116,528 in which a grommet having a set of fingers which are expandable by an expander plunger thrust therein, the grommet resisting expansion until a preselected force is applied. For some uses an increased resistance to an expansion force is desirable; however, such increased resistance requires that the grommet be increased in size, requiring a corresponding increase in the size of the opening required.

The present invention overcomes this problem by providing a region axially displaced from the grommet fingers wherein a tubular portion of the grommet is engaged by a portion of the expander plunger capable of radial contraction to produce increased frictional force without altering those portions of the grommet and plunger which enter the grommet receiving opening.

BRIEF DESCRIPTION OF THE FIGURES

FIG. 1 is a side view partially in section of the components of the fastener having the plunger entry resistance means, the components being shown separated with one component partially in section.

FIG. 2 is a side view with component partially in section, the components being shown interconnected but prior to expansion.

FIG. 3 is a partially sectional, partially side view of the fastener shown in its expanded or secured position.

FIG. 4 is a transverse sectional view taken through 4—4 of FIG. 1.

FIG. 5 is an end view of one component of the fastener.

DETAILED DESCRIPTION

The fastener which embodies the plunger entry resistance means includes an expansible grommet 1 and an expander plunger 2.

The expansible grommet 1 is provided with a bore 3 and is provided at one end with an external flange 4. Adjacent the flange is formed an external channel 5. Extending axially with respect to the channel 5 is a set of four fingers 6 separated by axially extending slots 7.

Adjacent the channel 5, the fingers 6 are provided internally with a retainer flange 8 interrupted by the slots 7. The fingers are also provided at their extremities with an internal constriction 9 having a beveled inner or upper edge 10. The constriction 9 is also interrupted by the slots 7. Externally, the extremities of the fingers 6 are beveled as indicated by 11.

The expander plunger 2 includes a stem 12 dimensioned to pass through the bore 3. The extended end of the stem 12 is provided with an expander head 13 having shallow retainer channels 14.

The stem 12 is provided in spaced relation to the head 13 with an integral friction ring 15 having a transverse slot 16. The extended end of the friction ring is beveled as indicated by 17. The outer surface of the friction ring is also beveled but to a much smaller degree than the beveled portion 17, the bevel or taper decreasing and reversing with increasing distance from the beveled portion 17. Beyond this end remote from the beveled portion 17, the expander plunger is provided with a shallow annular channel 18 which confronts a handle shoulder 19 forming a lower portion of the handle flange 20 surrounding a shallow depressed end 21.

Except for the friction ring 15 and its relation to the bore 3, the expansible grommet 1 and expander plunger 2 may be considered as conventional components of a fastener.

One of the uses of a fastener of this type is to removably secure two panels 22 and 23 together as shown in FIG. 3. If it is desired that the fastener be permanently secured to panel 22, this panel is provided with a perforation 24 which is slightly smaller than the diameter of the fingers 6. To support the grommet, the plunger is inserted partway, as indicated by dotted lines in FIG. 1. The grommet is then positioned over a perforation 24 and axial force is applied by the plunger 2 causing the fingers to restrict sufficiently for the fingers to pass through the panels 22 as shown in FIG. 2. However, if the plunger is carelessly manipulated or the grommet is not properly aligned with the perforation, the expander head 13 of the plunger may snap passed the constriction or retainer flange 8 and engage the beveled inner edge 10 of the constriction 9 causing the fingers to expand in the manner indicated in FIG. 3 so that the plunger and grommet are interlocked without the fingers entering the perforation 24.

If, however, the friction ring 15 is provided, sufficient resistance to movement of the plunger is provided so that the expander head 13 does not spread the fingers 6 so that the grommet may first be forced through the panel 22.

Once the grommet 1 has been positioned in the panel 22, the fingers 6 may readily be inserted in the perforation 25 of panel 23, as indicated in FIG. 2. When the two panels are in adjacent position as shown in FIG. 3, the friction ring 15 may be forced into the bore 3 and the expander head 13 forced between the constricted portions 9 of the fingers 6 locking the two panels together as shown in FIG. 3. When it is desired to disconnect the panels, an outward force applied to the plunger withdraws the friction ring 15 from the bore 3 and the expander head 13 from the constriction 9 returning the parts to the condition shown in FIG. 2.

Having fully described my invention, it is to be understood that I am not to be limited to the details herein set forth, but that my invention is of the full scope of the appended claims.

I claim:

1. A fastener adapted to be secured in a perforated member, the fastener comprising:
   a. a grommet having a sleeve portion with an entry end and a set of fingers continuing from its other end;
   b. A plunger having an expander portion slidable through the sleeve portion to engage inwardly inclined surfaces on said fingers and expand the fingers, and a radially contractable ring of normally greater diameter than the inside of said sleeve and spaced from said expander portion a distance no greater than the distance from said entry end to said inclined surfaces and thereby being engageable with the sleeve portion prior to expansion of the fingers by the expander portion, whereby the friction between the sleeve and ring increases the total force required to spread the fingers.

2. A fastener, as defined in claim 1, wherein:
   a. the friction ring includes a transverse opening to permit radial contraction of the ring.